US009824263B2

(12) United States Patent
Guo et al.

(10) Patent No.: US 9,824,263 B2
(45) Date of Patent: Nov. 21, 2017

(54) METHOD FOR PROCESSING IMAGE WITH DEPTH INFORMATION AND COMPUTER PROGRAM PRODUCT THEREOF

(71) Applicant: National Chiao Tung University, Hsinchu (TW)

(72) Inventors: Jiun-In Guo, Hsinchu (TW); Po-Yu Chien, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 44 days.

(21) Appl. No.: 15/187,487

(22) Filed: Jun. 20, 2016

(65) Prior Publication Data

US 2017/0249503 A1    Aug. 31, 2017

(30) Foreign Application Priority Data

Feb. 26, 2016    (TW) .............................. 105105845 A (51) Int. Cl.
| | |
|---|---|
| G06K 9/00 | (2006.01) |
| G06T 7/20 | (2017.01) |
| G06T 7/40 | (2017.01) |
| G06K 9/46 | (2006.01) |
| G06K 9/62 | (2006.01) |
| G06F 3/033 | (2013.01) |

(52) U.S. Cl.
CPC ....... *G06K 9/00335* (2013.01); *G06K 9/4604* (2013.01); *G06K 9/6202* (2013.01); *G06K 9/623* (2013.01); *G06T 7/20* (2013.01); *G06T 7/408* (2013.01)

(58) Field of Classification Search
USPC ........ 382/100, 103, 106–107, 154, 162–168, 382/173, 181, 190, 199, 209, 219, 224, 382/232, 254, 274–276, 286–291, 305, 382/312; 345/156; 715/863
See application file for complete search history.

(56) References Cited

U.S. PATENT DOCUMENTS

| | | | | |
|---|---|---|---|---|
| 2006/0188144 A1* | 8/2006 | Sasaki | ................ | G06K 9/00281 382/154 |
| 2013/0170736 A1* | 7/2013 | Guo | ....................... | G06T 5/002 382/154 |
| 2014/0157210 A1* | 6/2014 | Katz | ....................... | G06F 3/017 715/863 |
| 2014/0306877 A1* | 10/2014 | Katz | ....................... | G06F 3/017 345/156 |
| 2015/0378444 A1* | 12/2015 | Yin | .................... | G06K 9/00355 345/156 |

* cited by examiner

*Primary Examiner* — Seyed Azarian
(74) *Attorney, Agent, or Firm* — Muncy, Geissler, Olds & Lowe, P.C.

(57) ABSTRACT

The present invention proposes a method for processing an image with depth information and a computer program product thereof, wherein a filtering template is used to extract a gesture region and filter the image, and wherein the hue values of the pixels of the current gesture region are used to modify the self-adaptive thresholds of the filtering template, and wherein the size of the filtering template at the next time point is modified according to the depth at the current time point and the depth at the former time point.

23 Claims, 5 Drawing Sheets

Fig. 6

METHOD FOR PROCESSING IMAGE WITH DEPTH INFORMATION AND COMPUTER PROGRAM PRODUCT THEREOF

BACKGROUND OF THE INVENTION

1. Field of the Invention

The present invention relates to an image processing method for gesture tracking, particularly to a method for processing an image with depth information in a complicated background and a computer program product thereof.

2. Description of the Prior Art

At present, the conventional gesture tracking methods that process an image with depth information normally adopt a high-price image-capture device or a complicated algorithm. A common camera or a low-complexity algorithm is hard to support the task of the conventional gesture tracking methods. Most of the gesture tracking algorithms use a skin color filtering template having fixed threshold values in the preprocessing steps thereof. However, the algorithms using the conventional skin color filtering template are hard to maintain the accuracy and functionality of the system in a background having possible skin-color objects. For example, the wooden floor in the background may be mistaken as the gesture region and affect the correctness of gesture tracking.

Therefore, how to process images and track gestures in a background having skin color-like regions is a problem the related personnel eager to overcome.

SUMMARY OF THE INVENTION

The present invention provides a method for processing an image with depth information and a computer program product thereof, wherein a filtering template is used to extract a gesture region and filter the image, and wherein the self-adaptive threshold values of the filtering template are modified according to the hue values of the pixels of the gesture region, and wherein the size of the filtering template is modified according to the depth value at the former moment and the depth value at the current moment, whereby the present invention can effectively capture a gesture region to facilitate the succeeding application.

In one embodiment, the present invention proposes a method for processing an image with depth information, which is used to process a first image and a second image of a gesture and comprises steps: acquiring a plurality of feature points of the first image and the second image, and calibrating the first image and the second image to generate a first calibrated image and a second calibrated image; determining skin-color blocks and possible skin-color blocks in the first calibrated image and the second calibrated image, and distributing a filtering template to the skin-color blocks and the possible skin-color blocks, and binarizing the first calibrated image and the second calibrated image to generate a first binarized image and a second binarized image; detecting and tracking a first motion part of the first binarized image and a second motion part of the second binarized image to work out a first positional coordinate set of the first motion part and a second positional coordinate set of the second motion part; comparing the first positional coordinate set and the second positional coordinate set to work out a depth value of the gesture; comparing the depth value of the current time point and the depth value of the former time point to adjust a size of the template at the next time point.

In another embodiment, the present invention proposes a computer program product storing a method for processing an image with depth information. While the computer program is loaded into a computer, the computer can execute the method for processing an image with depth information. The method for processing an image with depth information comprises steps: acquiring a plurality of feature points of the first image and the second image, and calibrating the first image and the second image to generate a first calibrated image and a second calibrated image; determining skin-color blocks and possible skin-color blocks in the first calibrated image and the second calibrated image, and distributing a filtering template to the skin-color blocks and the possible skin-color blocks, and binarizing the first calibrated image and the second calibrated image to generate a first binarized image and a second binarized image; detecting and tracking a first motion part of the first binarized image and a second motion part of the second binarized image to work out a first positional coordinate set of the first motion part and a second positional coordinate set of the second motion part; comparing the first positional coordinate set and the second positional coordinate set to work out a depth value of the gesture; and adjusting a size of the template at the next time point according to the difference of the depth value of the current time point and the depth value of the former time point.

Below, embodiments are described in detail in cooperation with the attached drawings to make easily understood the objectives, technical contents, characteristics, and accomplishments of the present invention.

DESCRIPTION OF THE PREFERRED EMBODIMENTS

The present invention will be described in detail with embodiments and attached drawings below. However, these embodiments are only to exemplify the present invention but not to limit the scope of the present invention. In addition to the embodiments described in the specification, the present invention also applies to other embodiments. Further, any modification, variation, or substitution, which can be easily made by the persons skilled in that art according to the embodiment of the present invention, is to be also included within the scope of the present invention, which is based on the claims stated below. Although many special details are provided herein to make the readers more fully understand the present invention, the present invention can still be practiced under a condition that these special details are partially or completely omitted. Besides, the elements or steps, which are well known by the persons skilled in the art, are not described herein lest the present invention be limited unnecessarily. Similar or identical elements are denoted with similar or identical symbols in the drawings. It should be noted: the drawings are only to depict the present invention schematically but not to show the real dimensions or quantities of the present invention. Besides, matterless details are not necessarily depicted in the drawings to achieve conciseness of the drawings.

Figure 1:
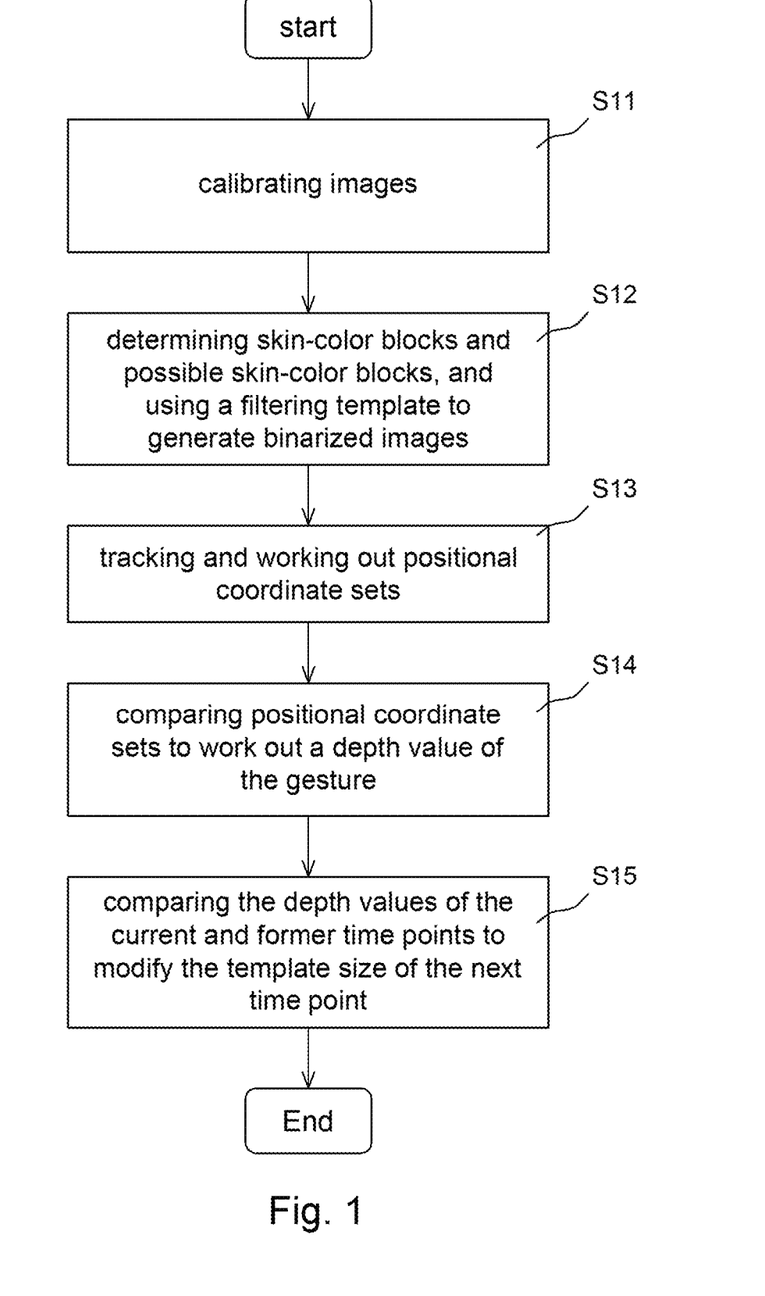
FIG. 1 is a flowchart of a method for processing an image with depth information according to one embodiment of the present invention.

Refer to FIG. 1 a flowchart of a method for processing an image with depth information according to one embodiment of the present invention. The method of the present invention is used to process a first image and a second image of a gesture and comprises steps: acquiring a plurality of feature points of the first image and the second image, and calibrating the first image and the second image to generate a first calibrated image and a second calibrated image (S11); determining skin-color blocks and possible skin-color blocks in the first calibrated image and the second calibrated image, and distributing a filtering template to the blocks, and binarizing the first calibrated image and the second calibrated image to generate a first binarized image and a second binarized image (S12); detecting and tracking a first motion part of the first binarized image and a second motion part of the second binarized image to work out a first positional coordinate set of the first motion part and a second positional coordinate set of the second motion part (S13); comparing the first positional coordinate set and the second positional coordinate set to work out a depth value of the gesture (S14); comparing the depth value of the current time point and the depth value of the former time point to adjust the template size of the next time point (S15). The technical contents of the abovementioned steps and other embodiments will be described below.

Figure 2:
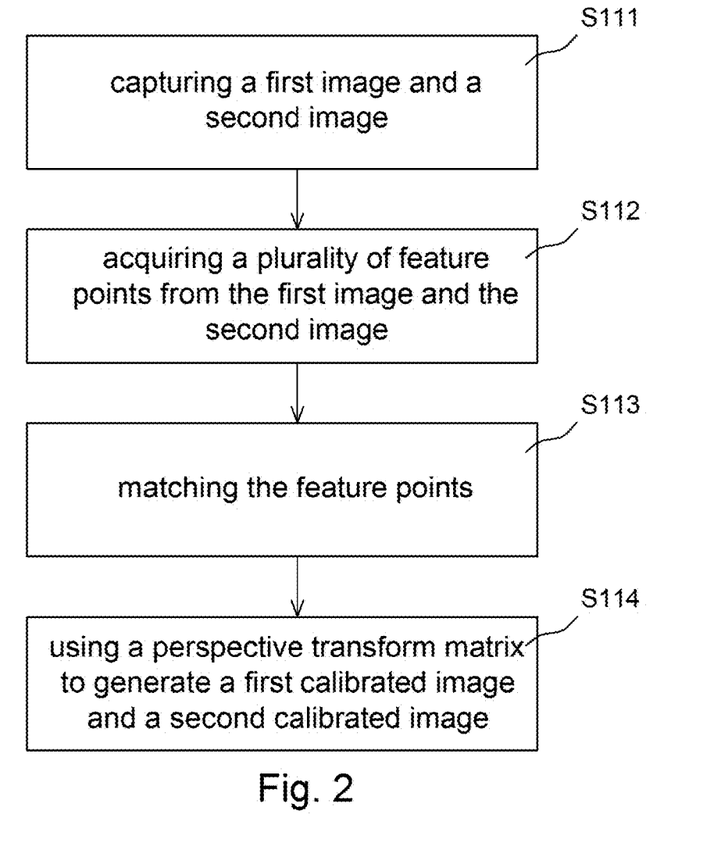
FIG. 2 is a flowchart of an image calibration step of a method for processing an image with depth information according to one embodiment of the present invention.

Refer to FIG. 2 for the detail of the image calibration step (S11) in FIG. 1. In one embodiment, the image calibration step further comprises Steps S111-S114. In Step S111, capture the first image and the second image. For example, a first image capture device and a second image capture device are a left-view camera and a right-view camera respectively disposed at the left and the right; the first image capture device and the second image capture device simultaneously capture an operation background to generate the first image and the second image. In Step S112, acquire a plurality of similar feature points from the first image and the second image according to the luminance values of the pixels of the first image and the second image. For example, a Scale-Invariant Feature Transform is used to work out a plurality of feature points from the first image according to the luminance values of the pixels; a plurality of feature points is also worked out from the second image similarly. In Step S113, match the plurality of feature points of the first image with the plurality of feature points of the second image. In Step S114, use a Perspective Transform to work out a transform matrix, use the transform matrix to project the matched feature points to a two-dimensional reference plane, determine the deviations of the positional coordinates of the projected feature points, and undertake calibration according to the deviations to generate a first calibrated image and a second calibrated image, which are parallel to each other.

In order to achieve a better effect of image processing and reduce the interference of environmental luminance, a hue transformation step is used to transform the RGB color space coordinates of the pixels in the images into the HSV color space coordinates, wherein H denotes hue, S denotes saturation, and V denotes value. The hue information will be used as the parameters in the succeeding image processing operation.

Figure 3:
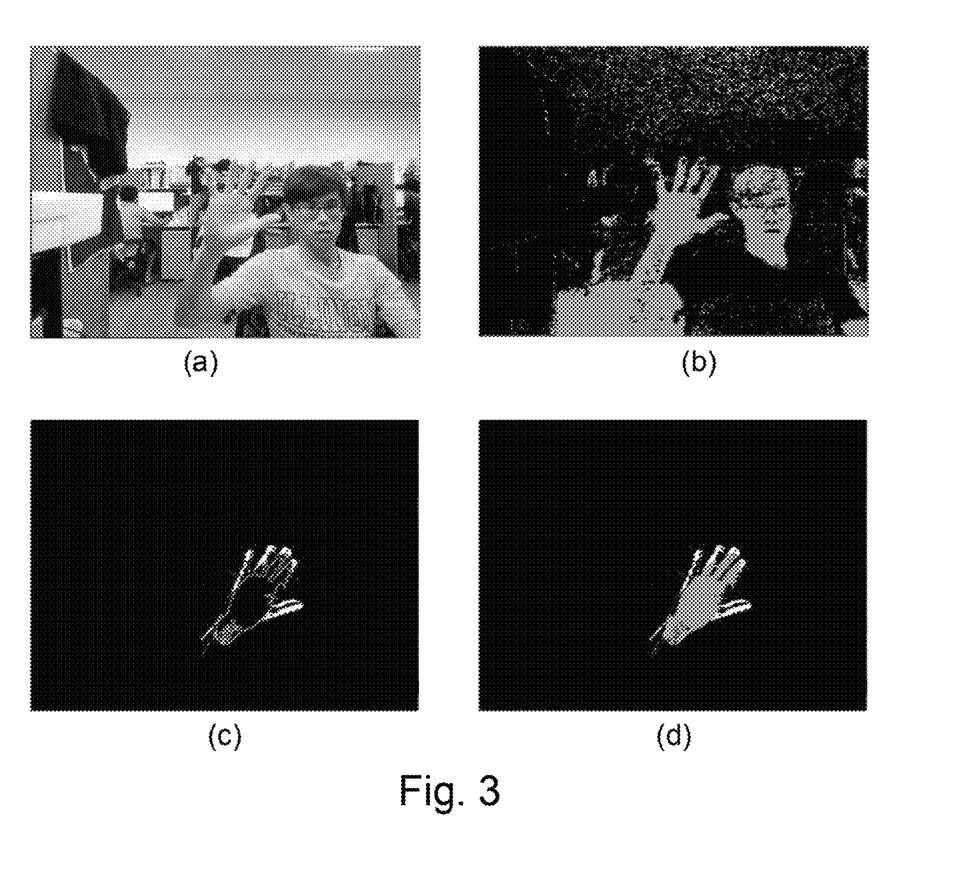
FIG. 3 shows images generated in different steps of a method for processing an image with depth information according to one embodiment of the present invention.

Refer to FIG. 3 showing images (a)-(d), which are used to demonstrate the binarization step (S12) in FIG. 1. The upper left image in FIG. 3 is a first calibrated image (a), wherein the face of the user, the objects whose color is similar to skin color, and the wooden floor are all the possible skin-color blocks. However, only the gesture of the user is the region to be recognized and tracked among them. Therefore, the gesture region is the skin-color block.

Figure 6:
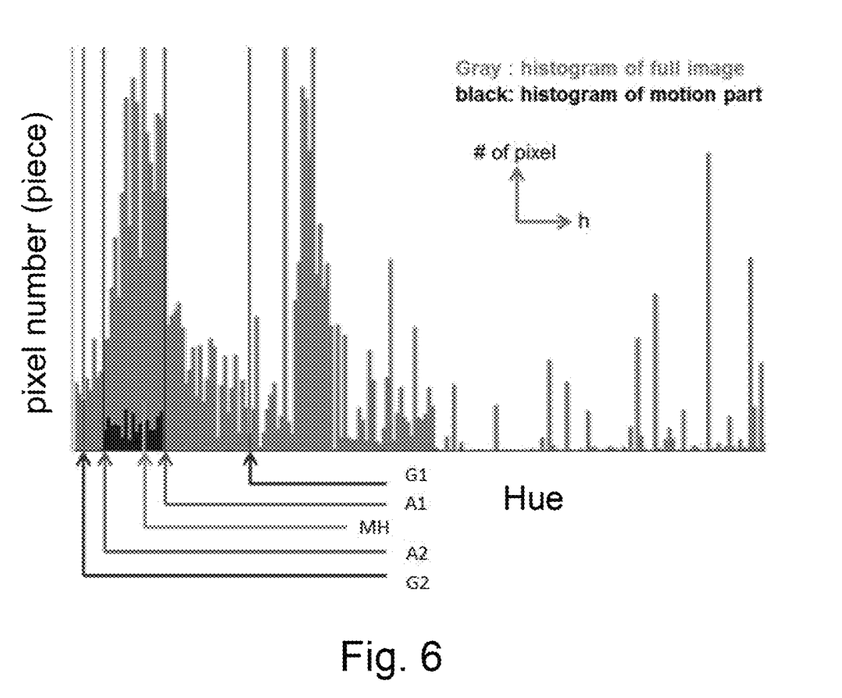
FIG. 6 is a hue-pixel number histogram generated by a method for processing an image with depth information according to one embodiment of the present invention.

Refer to FIG. 3 and FIG. 6. FIG. 6 is a hue-pixel number histogram generated by the image processing method according to one embodiment of the present invention. In FIG. 6, the gray part is the hue-pixel number histogram of the full first calibrated image or the full second calibrated image; the black part is the hue-pixel number histogram of the motion part of the first calibrated image or the second calibrated image. The first calibrated image (such as Image (a) in FIG. 3) is processed by the abovementioned hue transformation step and then processed by a panoramic hue filter to extract the skin color and obtain a panoramic binarized image (such as Image (b) in FIG. 3). The panoramic hue filter has a set of fixed threshold values, including an upper hue limit G1 and a lower hue limit G2, able to find out the possible skin-color blocks in the panoramic image, which not only include the gesture region of the user (i.e. the skin-color block) but also include the wooden floor and a portion of the objects in the background. If the method adopts only the panoramic hue filter, the complexity of computation and the time for processing would increase. For example, the system will spend time and computation resource in processing the floor image, which needn't be recognized and tracked.

In order to solve the abovementioned problem, a pixel difference filtering step is used to filter the image and extract from the image a motion part as the region to be processed in the succeeding skin color filtering step, as shown in Image (c) in FIG. 3. Below are described the technical contents of the pixel difference filtering step and the effect thereof. In contrast to the face of the user or the floor, which are still images, the gesture of the user is a dynamic image. Via comparing the current image and the former image to obtain the difference therebetween, a motion part can be obtained as the gesture region. Refer to FIG. 3 for the first calibrated image (Image (a)). Suppose the hue coordinates of a point at a time point t, i.e. the values of red, blue, and green of a pixel at a time point t, is expressed as P(x, y, t). Subtract the former hue coordinates from the current hue coordinates to obtain a difference. If the difference is greater than a preset threshold T, it indicates that the pixel belongs to a dynamic picture. If the difference is smaller than the preset threshold T, it indicates that the pixel belongs to a still picture. In other words, the subtraction of images can be used to determine a motion part B(x, y) according to the following equations:

$$B(x,y)=1, \text{ if } |P(x,y,t-1)-P(x,y,t)| \geq T$$

$$B(x,y)=0, \text{ if } |P(x,y,t-1)-P(x,y,t)| < T$$

wherein the region whose B(x, y) equals to 1 is the region needs processing by the skin color filtering step. In comparison with the skin color filtering of a full image, the image processing of the motion part, which is obtained by pixel filtering beforehand, has much lower computation complexity and consumes much less time.

Figure 4:
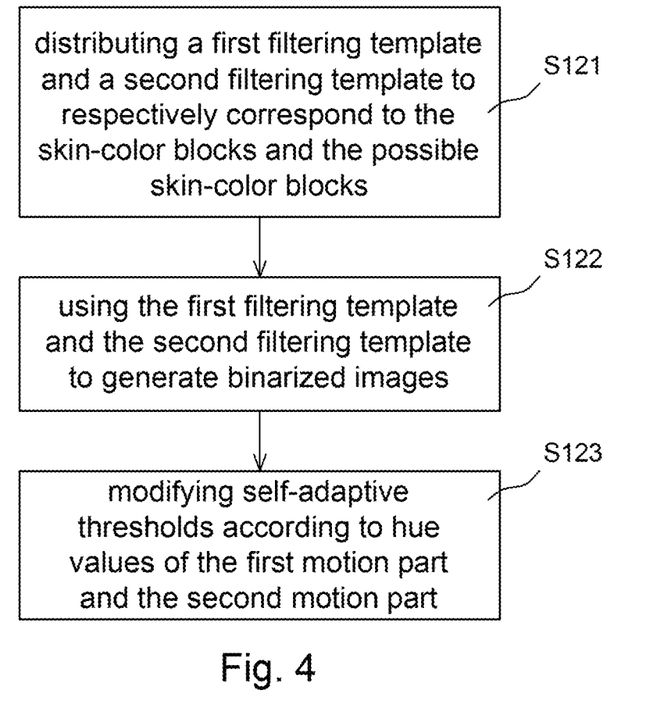
FIG. 4 is a flowchart of a method for processing an image with depth information according to another embodiment of the present invention.
Figure 5:
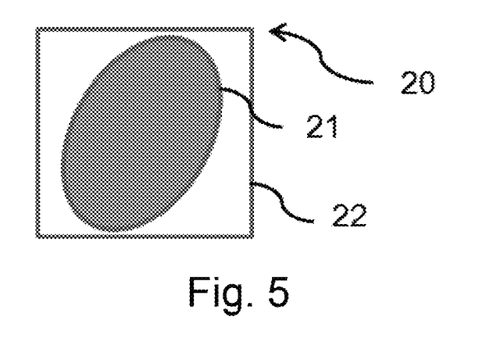
FIG. 5 schematically shows a filtering template used by a method for processing an image with depth information according to one embodiment of the present invention.

Refer to FIG. 4 for a flowchart of an image processing method according to another embodiment of the present invention. In this embodiment, distribute filtering templates to blocks. In Step S121, allocate a first filtering template and a second filtering template to respectively correspond to the skin-color blocks and the possible skin-color blocks. The filtering templates include but are not limited to be the first filtering template and the second filtering template. The first filtering template is used to define the skin-color blocks, and the second filtering template is used to define the possible skin-color blocks. The first filtering template and the second filtering template at least partially overlap. The image binarization step succeeds to the distribution of the filtering templates to the blocks. It is easily understood that the position of the filtering template moves with elapse of time. Therefore, a pixel filtering step must be performed on the pixels inside the second filtering template to find out dynamic objects. Only a skin color filtering step needs performing on the pixels of the first filtering template to generate a binarized image corresponding to the gesture. Therefore, in Step S122, according to the blocks the filtering templates are distributed to, the skin color filtering step is performed on the first calibrated image and the second calibrated image in the first filtering template; the pixel difference filtering step and the skin color filtering step are performed on the first calibrated image and the second calibrated image in the second filtering template, whereby to generate a first binarized image and a second binarized image. Refer to FIG. 5. In one embodiment, the first filtering template 21 of the filtering template 20 is an ellipse, and the area of the second filtering template 22 is greater than the area of the first filtering template 21. The elliptic block is worked out with a covariance matrix, having a long axis, a short axis and a rotation angle, approximating the contour of a binarized image.

The conventional hue filter only uses built-in fixed thresholds to filter skin color. However, skin color varies with different users. Hence, the range of the fixed thresholds is usually broadened to decrease the probability of misjudgments. Thus, the possible color-skin blocks will be excessively enlarged, which will prolong the processing time. If the hue range of the fixed thresholds is narrowed, the system may be neither able to detect the complete skin-color region nor able to extract the complete image of the gesture. In an extreme example, if the user wears a glove whose color is different from skin color, the conventional skin color filter may be unable to correctly extract the so-called skin-color block with the built-in fixed thresholds.

In order to overcome the abovementioned problem, in one embodiment, the filtering template includes self-adaptive thresholds, whereby to correctly extract the so-called skin-color block. The self-adaptive thresholds can automatically modify themselves according to the status of gesture tracking and the illumination of the background. Refer to FIG. 3, FIG. 4 and FIG. 6. In one embodiment, the filtering template modifies two self-adaptive thresholds A1 and A2 according to hue values of the motion parts, preferably according to a maximum hue value (MH) (Step S123). However, the present invention is not limited by this embodiment. It is easily understood that the pixel filtering step performed on the first calibrated image can generate a first motion part and a first binarized image. Similarly, the pixel filtering step performed on the second calibrated image can generate a second motion part and a second binarized image. Meanwhile are also worked out a first positional coordinate set of the first motion part and a second positional coordinate set of the second motion part, as shown in Image (c) in FIG. 3.

Therefore, the completeness and recognizability of the first binarized image and the second binarized image can be enhanced via modifying a set of self-adaptive thresholds A1 and A2 according to the hue values of the pixels in the first motion part and the second motion part (Step S123), as shown in Image (d) in FIG. 3. The self-adaptive thresholds A1 and A2 are within the range of the fixed thresholds G1 and G2 in FIG. 6. However, FIG. 6 is only for exemplification. The present invention is not limited by FIG. 6. In one embodiment, the image processing method of the present invention can effectively overcome the abovementioned problem of skin color variation, only using the self-adaptive thresholds A1 and A2 without using the conventional fixed thresholds G1 and G2. In other words, the present invention can completely extract a gesture region F(x, y) according to the following equations:

$$F(x,y)=1, \text{ if } A1 > h(x,y) \geq A2$$

$$F(x,y)=0, \text{ if } h(x,y) > A1 \text{ or } h(x,y) < A2$$

wherein A1 is a self-adaptive upper limit of color skin, A2 a self-adaptive lower limit of color skin, and h(x, y) the hue value of a pixel at a positional coordinates of the calibrated image. Combining the pixels having F(x, y)=1 inside the gesture region can completely and clearly present the binarized image of the gesture, as shown in Image (d) in FIG. 3. In comparison with the skin color filtering of a full image, the image processing of the motion part, which is obtained by pixel filtering beforehand, has much lower computation complexity and consumes much less time.

While the hand of the user passes an object in the background, which has the same color as the hand (such as the face), the filtering template may be stuck to the object, which may cause misjudgments in image tracking and image recognizing. The present invention enhances the correctness of gesture tracking and recognizing via predicting the track of the filtering template and modifying the size of the filtering template. The detail thereof is described below.

Refer to FIG. 1. In one embodiment, the step of detecting and tracking a motion part (Step S13) includes comparing the current first binarized image with the former first binarized image to predict the position of the filtering template at the next time point; and comparing the current second binarized image with the former second binarized image to predict the position of the filtering template at the next time point. The area where an object (such as the gesture) will appear at the next time point can be predicted according to the predicted position of the filtering template at the next time point. According to the change rate of the positions where the filtering template appears at different time points, i.e. the change rate of the positional coordinates of the motion part, the moving speed of the object can be worked out and used to modify the size of the filtering template. For example, the faster the speed at which the filtering template moves, the smaller the size of the filtering template. While the gesture region passes the face region, the filtering template is neither enlarged to the size of the face region nor stuck to the face region although both have the same color. In the present invention, the size of the filtering template at the next time point is modified according to the moving speed of the object, and the position of the filtering template is predicted according to the moving speed of the object also, whereby the gesture region can be effectively distinguished from the face region.

In one embodiment, the size of the filtering template is modified according to the depth of the object. The calculation of the depth is based on the parallax principle, wherein the displacements of the first binarized image and the second binarized image are converted into the depths, whereby is obtained special coordinates of the gesture, including a horizontal coordinate, a vertical coordinate and a depth. Therefore, the present invention compares the depth of the filtering template at the current time point with the depth of the filtering template at the former time point and modifies the size of the filtering template at the next time point according to the comparison result. For example, the deeper the depth of the filtering template, the smaller the size of the filtering template. Therefore, while the gesture region passes the face region, the filtering template is neither enlarged to the size of the face region nor stuck to the face region although both have the same color.

In one embodiment, the image processing method further comprises a gesture recognition step: outputting a gesture recognition value according to at least one of the depth, the movement information and a rotation angle. For example, from the results of the tracking and calculation step (Step S13) and the gesture depth calculation step (Step S14) in FIG. 1, the historical record of gesture tracking is acquired and used in the succeeding recognition; the rotation angle of the gesture is approached via calculating the rotation angle of the ellipse in FIG. 5, which approximates the contour of the gesture. However, the present invention is not limited by the abovementioned example. The present invention uses the abovementioned gesture recognition step to generate a recognition value and uses the recognition value to control an electronic device. In one embodiment, waving the hand left and right is used to vary the value intended to control. For example, waving the hand left increases the value, and waving the hand right decreases the value. In one embodiment, the depth is used to select the controlled item, such as the volume or channel of a television. For example, fast swinging the hand can be used as a trigger signal to fast switch the controlled item. In one embodiment, after the item is triggered, the included angle between the gesture and the vertical line is used to determine the speed of varying the controlled value; the larger the included angle, the faster the variation of the controlled value; the smaller the included angle, the slower the variation of the controlled value.

In one embodiment, the depth for control can be customized and limited to a specified range to prevent from that the gestures of non-users interfere with the control of the user. While the depth of a gesture exceeds the depth range for control, the image processing method of the present invention would stop outputting the recognition value of the gesture. For example, in order to effectively recognize the gesture control signal of the driver in a running vehicle, only the gesture signal of the user on the driver seat is regarded as the meaningful gesture to be recognized; the gestures of the passengers on the other seats exceed the depth range for control and do not generate any recognition value.

In the Internet age, the method for processing an image with depth information of the present invention not only can be stored in a computer multimedia (such as an optical disc) but also can be downloaded by the user from the Internet and then stored in a carrier and executed by the carrier. The carrier may be but is not limited to be a tablet computer, a smart phone, a notebook computer, a desktop computer, or a vehicular computer.

In conclusion, the present invention proposes a method for processing an image with depth information and a computer program product thereof, wherein a filtering template is used to extract a gesture region and filter the image to greatly reduce the computation complexity and decrease the processing time, and wherein the hue values of the pixels of the current gesture region are used to modify the self-adaptive thresholds of the filtering template so as to prevent the filtering template from being stuck to an object in the background and avoid misjudgments in image tracking and recognizing, and wherein the size of the filtering template at the next time point is modified according to the depth at the current time point and the depth at the former time point so as to effectively distinguish the gesture region from the face region, and wherein the depth range for control can be customized and limited to a specified range so as to prevent the gestures of non-users from interfering with the control of the user.

What is claimed is:

1. A method for processing an image with depth information, used to process a first image and a second image of a gesture, and comprising steps:

acquiring a plurality of feature points of said first image and said second image, and calibrating said first image and said second image to generate a first calibrated image and a second calibrated image;

determining skin-color blocks and possible skin-color blocks of said first calibrated image and said second calibrated image, distributing a filtering template to said skin-color blocks and said possible skin-color blocks, binarizing said first calibrated image and said second calibrated image to generate a first binarized image and a second binarized image;

detecting and tracking a first motion part of said first binarized image and a second motion part of said second binarized image, and working out a first positional coordinate set of said first motion part and a second positional coordinate set of said second binarized image;

comparing said first positional coordinate set and said second positional coordinate set to work out a depth of said gesture; and comparing one said depth at a current time point and one said depth at a former time point to modify a size of said filtering template at a next time point, wherein said step of acquiring a plurality of feature points of said first image and said second image and calibrating said first image and said second image further comprises a step:

acquiring said features points according to luminance values of pixels of said first image and said second image.

2. The method for processing an image with depth information according to claim 1 further comprising a step:

respectively using a first image capture device and a second image capture device to capture said first image and said second image.

3. The method for processing an image with depth information according to claim 1, wherein said step of acquiring a plurality of feature points of said first image and said second image and calibrating said first image and said second image further comprises a step: matching said feature points of said first image and said feature points of said second image.

4. The method for processing an image with depth information according to claim 3, wherein said step of acquiring a plurality of feature points of said first image and said second image and calibrating said first image and said second image further comprises a step:

using a perspective transform to project said feature points to a two-dimensional reference plane to make said first calibrated image parallel to said second calibrated image.

5. The method for processing an image with depth information according to claim 1, wherein said filtering template includes a first filtering template and a second filtering template; said first filtering template is defined as said skin-color block, said second filtering template is defined as said possible skin-color block; said first filtering template at least partially overlaps said second filtering template.

6. The method for processing an image with depth information according to claim 5, wherein said first filtering template is an ellipse, and said second filtering template is larger than said first filtering template.

7. The method for processing an image with depth information according to claim 5, wherein a skin color filtering step is performed on said first calibrated image and said second calibrated image of said first filtering template; a pixel difference filtering step and said skin color filtering step are performed on said first calibrated image and said second calibrated image of said second filtering template.

8. The method for processing an image with depth information according to claim 1, wherein self-adaptive thresholds are used in said step of binarizing said first calibrated image and said second calibrated image, and wherein said filtering template modifies said self-adaptive thresholds according to hue values of at least one of said first motion part and said second motion part and hue values of at least one of said first calibrated image and said second calibrated image.

9. The method for processing an image with depth information according to claim 1, wherein said step of detecting and tracking said first motion part of said first binarized image includes a step of comparing one said first binarized image at a current time point and one said first binarized image at a former time point to predict a position of said filtering template at a next time point, and wherein said step of detecting and tracking said second part of said second binarized image includes a step of comparing one said second binarized image at a current time point and one said second binarized image at a former time point to predict a position of said filtering template at a next time point.

10. The method for processing an image with depth information according to claim 1 further comprising a step:
outputting a recognition value of said gesture according to at least one of said depth, a movement information and a rotation angle.

11. The method for processing an image with depth information according to claim 10, wherein said step of outputting said recognition value of said gesture further comprises a step:
stopping outputting said recognition value when said depth of said gesture exceeds a depth range for control.

12. A non-transitory computer program product storing a program for processing an image with depth information, wherein after said computer program product is loaded into a computer, said computer can execute a method for processing an image with depth information, used to process a first image and a second image of a gesture, and comprising steps:
acquiring a plurality of feature points of said first image and said second image, and calibrating said first image and said second image to generate a first calibrated image and a second calibrated image;
determining skin-color blocks and possible skin-color blocks of said first calibrated image and said second calibrated image, distributing a filtering template to said skin-color blocks and said possible skin-color blocks, binarizing said first calibrated image and said second calibrated image to generate a first binarized image and a second binarized image;
detecting and tracking a first motion part of said first binarized image and a second motion part of said second binarized image, and working out a first positional coordinate set of said first motion part and a second positional coordinate set of said second binarized image;
comparing said first positional coordinate set and said second positional coordinate set to work out a depth of said gesture; and
comparing one said depth at a current time point and one said depth at a former time point to modify a size of said filtering template at a next time point,
wherein said step of acquiring a plurality of feature points of said first image and said second image and calibrating said first image and said second image further comprises a step:
acquiring said features points according to luminance values of pixels of said first image and said second image.

13. The computer program product storing a program for processing an image with depth information according to claim 12 further comprising a step:
respectively using a first image capture device and a second image capture device to capture said first image and said second image.

14. The computer program product storing a program for processing an image with depth information according to claim 12, wherein said step of acquiring a plurality of feature points of said first image and said second image and calibrating said first image and said second image further comprises a step:
acquiring said features points according to luminance values of pixels of said first image and said second image.

15. The computer program product storing a program for processing an image with depth information according to claim 14, wherein said step of acquiring a plurality of feature points of said first image and said second image and calibrating said first image and said second image further comprises a step:
matching said feature points of said first image and said feature points of said second image.

16. The computer program product storing a program for processing an image with depth information according to claim 15, wherein said step of acquiring a plurality of feature points of said first image and said second image and calibrating said first image and said second image further comprises a step:
using a perspective transform to project said feature points to a two-dimensional reference plane to make said first calibrated image parallel to said second calibrated image.

17. The computer program product storing a program for processing an image with depth information according to claim 12, wherein said filtering template includes a first filtering template and a second filtering template; said first filtering template is defined as said skin-color block, said second filtering template is defined as said possible skin-color block; said first filtering template at least partially overlaps said second filtering template.

18. The computer program product storing a program for processing an image with depth information according to claim 17, wherein said first filtering template is an ellipse, and said second filtering template is larger than said first filtering template.

19. The computer program product storing a program for processing an image with depth information according to claim 17, wherein a skin color filtering step is performed on said first calibrated image and said second calibrated image of said first filtering template; a pixel difference filtering step and said skin color filtering step are performed on said first calibrated image and said second calibrated image of said second filtering template.

20. The computer program product storing a program for processing an image with depth information according to claim 12, wherein self-adaptive thresholds are used in said step of binarizing said first calibrated image and said second calibrated image, and wherein said filtering template modifies said self-adaptive thresholds according to hue values of at least one of said first motion part and said second motion part and hue values of at least one of said first calibrated image and said second calibrated image.

21. The computer program product storing a program for processing an image with depth information according to claim 12, wherein said step of detecting and tracking said first motion part of said first binarized image includes a step of comparing one said first binarized image at a current time point and one said first binarized image at a former time point to predict a position of said filtering template at a next time point, and wherein said step of detecting and tracking said second part of said second binarized image includes a step of comparing one said second binarized image at a current time point and one said second binarized image at a former time point to predict a position of said filtering template at a next time point.

22. The computer program product storing a program for processing an image with depth information according to claim 12 further comprising a step:
 outputting a recognition value of said gesture according to at least one of said depth, a movement information and a rotation angle.

23. The computer program product storing a program for processing an image with depth information according to claim 22, wherein said step of outputting said recognition value of said gesture further comprises a step: stopping outputting said recognition value when said depth of said gesture exceeds a depth range for control.

* * * * *